2,948,718
Patented Aug. 9, 1960

2,948,718
NEW N-HETEROCYCLIC COMPOUNDS

Walter Schindler, Riehen, near Basel, Switzerland, assignor to Geigy Chemical Corporation, Ardsley, N.Y., a corporation of Delaware No Drawing. Filed Nov. 20, 1958, Ser. No. 775,120

Claims priority, application Switzerland, Dec. 20, 1957

2 Claims. (Cl. 260—239)

The present invention concerns new N-heterocyclic compounds which have valuable pharmacological properties as well as a process for the production thereof.

N-substituted azepines of the general formula $$\text{structure (I)}$$

wherein X and Y represent hydrogen or halogen atoms, and $R_1$ and $R_2$ represent hydrogen or low molecular alkyl radicals which latter can be bound to each other direct or by way of an oxygen atom, have not been known up to now. It has now been found that these compounds have pharmacologically valuable properties, in particular, that they have anti-convulsive activity and, therefore, are suitable for example, for use as anti-epileptica.

The azepine derivatives defined above can be produced by reacting 5-dibenzo[b.f]azepines which correspond to the general formula $$\text{structure (II)}$$

and which will be termed in the following as iminostilbenes, with phosgene and then reacting the 5-chlorocarbonyl-iminostilbenes obtained with ammonia or amines of the general formula $$H-N\begin{matrix}R_1\\R_2\end{matrix} \quad (III)$$

wherein X, Y, $R_1$ and $R_2$ have the meanings given above. The reaction with phosgene is performed advantageously in an inert organic solvent such as, e.g. benzene or toluene, at a raised temperature. The reaction of the 5-chlorocarbonyl compounds with ammonia or a primary or secondary amine can also be performed in organic solvents at room temperature or, if necessary, in autoclaves at a raised temperature. Also, a larger excess of the amine used for the reaction can be used as diluent and, in this case also, the reaction can be performed either in autoclaves or in an open vessel at normal or raised temperature according to the boiling temperature of the amine used. Advantageously at least one molar excess of amine serves to bind the hydrogen chloride liberated in the reaction, also when the reaction is performed in the presence of a solvent.

The starting materials of the general Formula II are obtained from 10.11-dihydro-5-dibenzo[b.f]azepine (iminodibenzyl) or the C-substitution products thereof by N-acylation, bromination in the 10-position with bromosuccinimide and subsequently or simultaneously splitting off hydrogen bromide, and hydrolysis for example by means of alkali lyes. Apart from the parent substance, for example, 3.7-dichloro-iminostilbene, is a suitable iminostilbene of the general formula II. Methylamine, ethylamine, n-propylamine, isopropylamine, n-butylamine, methyl-ethylamine, diethylamine, di-n-propylamine, di-n-butylamine and methyl-n-butylamine, pyrrolidine, piperidine and morpholine can be named as amines of the general Formula III.

A modification of the process for the production of compounds of the general Formula I, in particular of those in which at least one radical R is different from hydrogen, conisits in reacting iminostilbenes of the general Formula II with reactive derivatives of carbamic acids derived from amines of the general Formula III. In particular, a carbamic acid chloride of the general formula $$Cl-CO-N\begin{matrix}R_1\\R_2\end{matrix} \quad (IV)$$

wherein $R_1$ and $R_2$ represent in particular low molecular alkyl radicals which can be bound to each other direct or by way of an oxygen atom, or an alkyl isocyanate of the general formula $$O=C=N-R_1 \quad (V)$$

wherein $R_1$ represents a low molecular alkyl radical, is reacted with an iminostilbene of the general Formula II. These reactions can be performed in the presence or absence of inert solvents.

In most cases, starting materials of the general Formulae IV and V are most simply obtained from phosgene and amines of the general Formula III. The two processes which can be used for the production of compounds of the general Formula I differ, therefore, only in the reaction sequence, that is the order in which the three reaction components, phosgene, iminostilbene of the general Formula II and amine of the general Formula III, are reacted with each other.

The compounds according to the present invention may be administered, for example, perorally, in daily doses of 100 mg. to 600 mg., in the form of tablets or dragées containing, e.g. 100 mg. of active substance.

The following examples further illustrate the production of the new compounds. Parts are given as parts by weight and their relationship to parts by volume is as that of grammes to cubic centimetres. The temperatures are in degrees centigrade.

Example 1

19.3 parts of iminostilbene are dispersed in 100 parts by volume of toluene. Phosgene is then introduced whereupon the temperature of the reaction mixture rises to 70°.

While boiling under reflux, further phosgene is introduced until all the iminostilbene has dissolved and the hydrogen chloride development is complete. The reaction mixture is then cooled and the 5-chlorocarbonyl iminostilbene which has crystallised out is filtered off under suction. It melts at 168–169°.

12.8 parts of 5-chlorocarbonyl iminostilbene are dispersed in 128 parts by volume of abs. ethanol and ammonia gas is introduced for three hours into this mixture while stirring at boiling temperature. The reaction is complete after this time; the reaction mixture is cooled and the crystals which precipitate are filtered off under suction. The ammonium chloride is washed from the crystals with water and the residue is recrystallised first from abs. ethanol and then from benzene. 5-carbamyl iminostilbene is obtained which melts at 204–206°.

If the iminostilbene is replaced by 26.2 parts of 3.7- dichloro-iminostilbene or by 35.1 parts of 3.7-dibromo-iminostilbene, then 3.7-dichloro-5-carbamyl-iminostilbene or 3.7-dibromo-5-carbamyl iminostilbene is obtained in an analogous manner.

*Example 2*

12.8 parts of the 5-chlorocarbonyl iminostilbene obtained according to Example 1 are boiled under reflux with 40 parts of diethylamine for 4 hours. The reaction mixture is then cooled, poured into water and the crystals of 5-diethyl carbamyl iminostilbene which precipitate are filtered off under suction. After recrystallisation from ethanol, the product melts at 134–135°.

5-piperidino-carbonyl iminostilbene, 5-pyrrolidino-carbonyl iminostilbene and 5-morpholino-carbonyl iminostilbene are obtained in an analogous manner.

*Example 3*

19.3 parts of iminostilbene are dissolved hot in 250 parts by volume of xylene. 27 parts of diethyl carbamic acid chloride dissolved in xylene are added to this solution dropwise at boiling temperature. The whole is then boiled until no more hydrogen chloride is developed and then the greater part of the xylene and the excess diethyl carbamic acid chloride are distilled off. On cooling, the 5-diethyl carbamyl iminostilbene crystallises out. It is filtered off under suction and recrystallised from ethyl alcohol when it then has a melting point of 134–135°.

What I claim is:
1. An N-heterocyclic compound of the formula

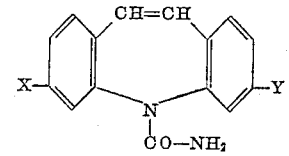

wherein each of X and Y represents a member selected from the group consisting of hydrogen and halogen.

2. 5-carbamyl-iminostilbene.

References Cited in the file of this patent
UNITED STATES PATENTS 2,762,796    Morel et al. _____ Sept. 11, 1956

FOREIGN PATENTS 668,659    Great Britain _____ Mar. 19, 1952